(12) United States Patent
Hallsten

(10) Patent No.: US 6,802,157 B2
(45) Date of Patent: Oct. 12, 2004

(54) TANK COVER SYSTEM WITH SUBSTANTIAL GAS SEAL

(75) Inventor: Jeffrey A. Hallsten, Sacramento, CA (US)

(73) Assignee: Hallsten Corporation, Sacramento, CA (US)

( * ) Notice: Subject to any disclaimer, the term of this patent is extended or adjusted under 35 U.S.C. 154(b) by 295 days.

(21) Appl. No.: 10/116,677

(22) Filed: Apr. 4, 2002

(65) Prior Publication Data

US 2002/0157323 A1 Oct. 31, 2002

Related U.S. Application Data

(63) Continuation-in-part of application No. 09/248,775, filed on Feb. 12, 1999, now abandoned.

(51) Int. Cl.[7] .............................. E04B 1/32; E04G 11/04
(52) U.S. Cl. ........................ 52/3; 52/3; 52/5; 52/282.1; 52/650.3; 52/762
(58) Field of Search .............................. 52/5, 3, 64, 71, 52/592.1, 650.3, 731.7, 762, 72, 246

(56) References Cited

U.S. PATENT DOCUMENTS 4,041,722 A  *  8/1977  Terlesky et al. ............. 62/45.1
5,921,030 A  *  7/1999  Ducotey et al. ................. 52/3

* cited by examiner

Primary Examiner—Carl D. Friedman
Assistant Examiner—Chi Q Nguyen
(74) Attorney, Agent, or Firm—Thomas M. Freiburger

(57) ABSTRACT

A substantially gas tight cover for an open-top structure such as a tank requires very few fasteners and allows for thermal expansion and contraction movement while still maintaining the nearly complete gas seal. Unique metal extrusions are assembled on-site in a modular system that is easily put together. An important component of the system is a gutter extrusion which includes an elongated gutter and flanges with sealing gaskets for engaging the top surface of the concrete tank rim as well as engaging the inner wall of the tank below the top. At intervals along the gutter strip are hold-down clips that interlock with the gutter extrusion and are secured in the concrete of the tank, spaced back from the tank edge. Fasteners in the inside face of the tank preferably are avoided. Main spanning beams for the tank cover are connected to the gutter extrusions in a way so as to allow for thermal expansion and contraction, without losing the gas seal.

7 Claims, 8 Drawing Sheets

TANK COVER SYSTEM WITH SUBSTANTIAL GAS SEAL

This application is a continuation in part of Ser. No. 09/248,775 filed on Feb. 12, 1999 now abandoned.

BACKGROUND OF THE INVENTION

The invention is concerned with covers for large tanks, particularly tanks in sewage treatment processes, for containing malodorous gases.

Tank covers of the general type with which this invention is concerned are shown in U.S. Pat. Nos. 6,151,835, 6,012,259, 5,941,027, 5,911,662, 5,617,677, 5,545,358 and 5,325,646. These patents are incorporated herein by reference.

Increasingly there is a need for covers to enclose in-ground and above ground tanks used for storing waste materials including sewage, chemical sludge, petroleum products and other volatile and odorous materials. The materials generally are stored for later disposal or treatment in such tanks. Such a cover must be substantially gas tight for controlling odors in the vicinity of the tank site and for trapping potentially hazardous gases. Often the gases are withdrawn for cleaning, such as by biofiltration, placing a slight vacuum in the airspace above the tank. The tank should be substantially seated to minimize intrusion of air.

A tank cover is generally too large to be conveniently or cost effectively shipped in an assembled form from a manufacturer to the site of the tank. Because of this, tank covers for relatively large tanks are generally shipped as components and assembled at the site.

Prior art tank covers made of steel are heavy and expensive even to ship in component form. Further, such covers usually require welded connections and bolted connections in their assembly. As such, skilled personnel may be necessary to carry out the assembly, and the assembly process may be lengthy and costly. Some prior tank covers have been formed of sheet metal panels assembled at the site.

It is a purpose of the present invention to produce a highly modular tank cover system which requires very few fasteners and which allows for thermal expansion and contraction movement while still maintaining an almost complete gas seal.

SUMMARY OF THE INVENTION

The invention accomplishes these goals with unique metal extrusions which are assembled on-site in a modular system that is easily put together, with almost no fasteners and with other features providing for efficiency in installation and an effective substantially gas tight seal.

The system includes spanning beams of the appropriate size and spacing for the tank span to be covered. This may be, for example, approximately 12 feet to over 20 feet. Such span lengths can overlap with those addressed by the tank cover structure in U.S. Pat. No. 6,012,259, and can extend to greater lengths with larger beams or closer beam spacing.

In the system of the invention, a modular and nearly fastener-free cover system, substantially gas tight, is provided for open-top tanks which may be of the types described above. An important component is a gutter extrusion which includes a elongated gutter and flanges with sealing gaskets for engaging the top surface of the concrete on the tank as well as the inner wall of the tank several inches below the top. The gutter extrusion has gas seals at each of these two contact areas. The gasket seal which bears against the inner wall of the tank preferably comprises a structural member as well as a seal, helping hold the flange of the gutter extrusion from the tank wall. The seal preferably is pleated, with a type of bellows configuration, allowing the seal to compress to varying degrees on an irregular concrete surface, while still maintaining a seal. This and other seals may advantageously be formed of multi-durometer Santoprene.

The gutter strip is secured to the tank structure by a series of hold-down clips which are spaced apart at intervals, primarily at positions adjacent to the series of beams. These hold-down clips advantageously are extrusions, cut to the desired width (e.g. about 4 inches), with interlocking structure for sliding interlocking engagement with the gutter extrusion upon assembly. The cross section of the hold-down clip is configured to mate with the cross section of the horizontal flange on the gutter strip. On assembly to the tank, these hold-down clips are secured into the concrete using concrete anchor bolts, at a position somewhat removed from the tank edge, e.g. about 5 inches away. This provides for a stronger concrete anchoring by removing the anchor from near the edge of the concrete, and also helps avoid problems with other structure existing around the tank, such as handrails. Further, the bolt hole in the hold-down clip for receiving the anchor bolt preferably is angled such that the bolt is assembled obliquely from the outside, at an angle which may be about 15° to 30°. This further aids in assembly by avoiding problems with handrails and other structure, and also helps draw the clip into firm engagement with the gutter strip. The purpose of the clips is to structurally prevent the gutter strips from pulling or tipping inwardly into the tank.

It is an important feature that the gutter is secured only with fasteners entering into the horizontal surface of the concrete, without requiring any fasteners to be secured into the vertical face of the tank, providing for considerably easier installation and avoiding the requirement that the installer enter the tank.

The gutter extrusion is thus cantilevered over the tank. Structural spanning beams rest on a platform at the inward side of the gutter extrusion, the entire extrusion having a relatively large width, e.g. 7 inches to 12 inches, and preferably about 10 inches to 11 inches, and extending over the tank about 8 inches to 9 inches in one preferred embodiment. These dimensions of course depend on the scale of the tank cover project, but the preferred dimensions will serve spans of a length somewhat more than 20 feet.

The manner which the spanning beams are supported on and secured to the gutter extrusion forms an important feature of the system. Thermal expansion and contraction are encountered to a considerable degree in large tank covers, primarily cause by changes in external atmospheric conditions. A beam of 20 feet or more can exhibit a length difference of ¼ inch to ½ inch, between extremes of temperature. Importantly, the beams in the system of the invention are not secured to the gutter extrusions by fasteners, but instead are retained by a unique connection which allows for thermal expansion/contraction (length of the beam) and for movement in the perpendicular direction as well. This connection comprises a hold-down member which assembles slidingly into the gutter extrusion, at the side of the extrusion inboard of the tank. The gutter extrusion is formed in a preferred embodiment with a "key" shape which receives the slidable hold-down member by end assembly, such that the hold-down member cannot pull upwardly out of the gutter extrusion. Various such slidable, interlocking shapes can be used. The slidable hold-down connection member allows the beams to be moved to the appropriate positions on assembly, and also allows for other shifting in position which may occur due to thermal expansion and contraction affects.

The decking of the tank cover system preferably is formed of assembled extrusions (e.g. aluminum extrusions), similar to what is shown in U.S. Pat. Nos. 6,151,835, 6,012,259, 5,941,027, 5,911,662 and 5,617,677, referenced above. These preferably aluminum extrusions are assembled in substantially sealed relationship in panels, each panel resting on two of the spaced apart beams. The panels may be formed of interlocked deck slats extending in a direction perpendicular to the beams, with panel end members attached to edge deck planks and having flanges extending outwardly for sealing, and channel sections extending perpendicular to the deck planks and parallel to the main beams, receiving the ends of the deck planks, and with flanges which extend outwardly to rest on the beams. Gasket seals are positioned between the top of the beam and the flange of the panel. In a preferred embodiment, these gasket seals are slidingly connected to the tops of the extruded beams, in an interlocking connection, and with each gasket seal having two main ribs extending in parallel, each rib positioned to engage the underside of a flange from the deck panel.

For sealing the space at ends of the main beams, extruded flashing is secured to the gutter extrusion. These flashing components are continuous along sides of the tank, running perpendicular to the lengths of the beams. The flashing components may be Z-shaped, with a bottom flange having an interlock gasket seal for engaging downwardly against an outer end of the beam platform of the gutter extrusion. This component is secured down to the gutter extrusion, and tapered, self-tapping screws are advantageously used.

The upper flange of the flashing member retains a further gasket on its upper surface, and this is for sealing engagement with the overhanging flanges of the deck panels that extend in this direction. The edge of the sealing gasket abuts against the ends of the gasket seals which are secured to the tops of the beams, providing a part of the system gas seal, which is substantially air tight.

Another component of the assembly is a cap which is used on top of each beam, running parallel to the beam lengths. The cap, which may be about one-quarter inch thick and about one inch or so wide and formed of stainless steel, has left and right edges which clamp down against the edges of the two adjacent panels on either side of the beam, compressing the overhanging flanges of those panels down against the beam top gasket. The caps may be secured to the beam by self-tapping screws.

Accordingly, the tank cover system of the invention provides versatility in serving a wide variety of tank sizes, provides for easy and efficient assembly, substantially avoids fasteners and particularly avoids rigid connections between the beams and the peripheral beam support, makes wide allowance for thermal expansion and contraction, and provides a high integrity gas seal. These and other objects, advantages and features of the invention will be apparent from the following description of preferred embodiments, considered along with the drawings.

DESCRIPTION OF PREFERRED EMBODIMENTS

Figure 1:
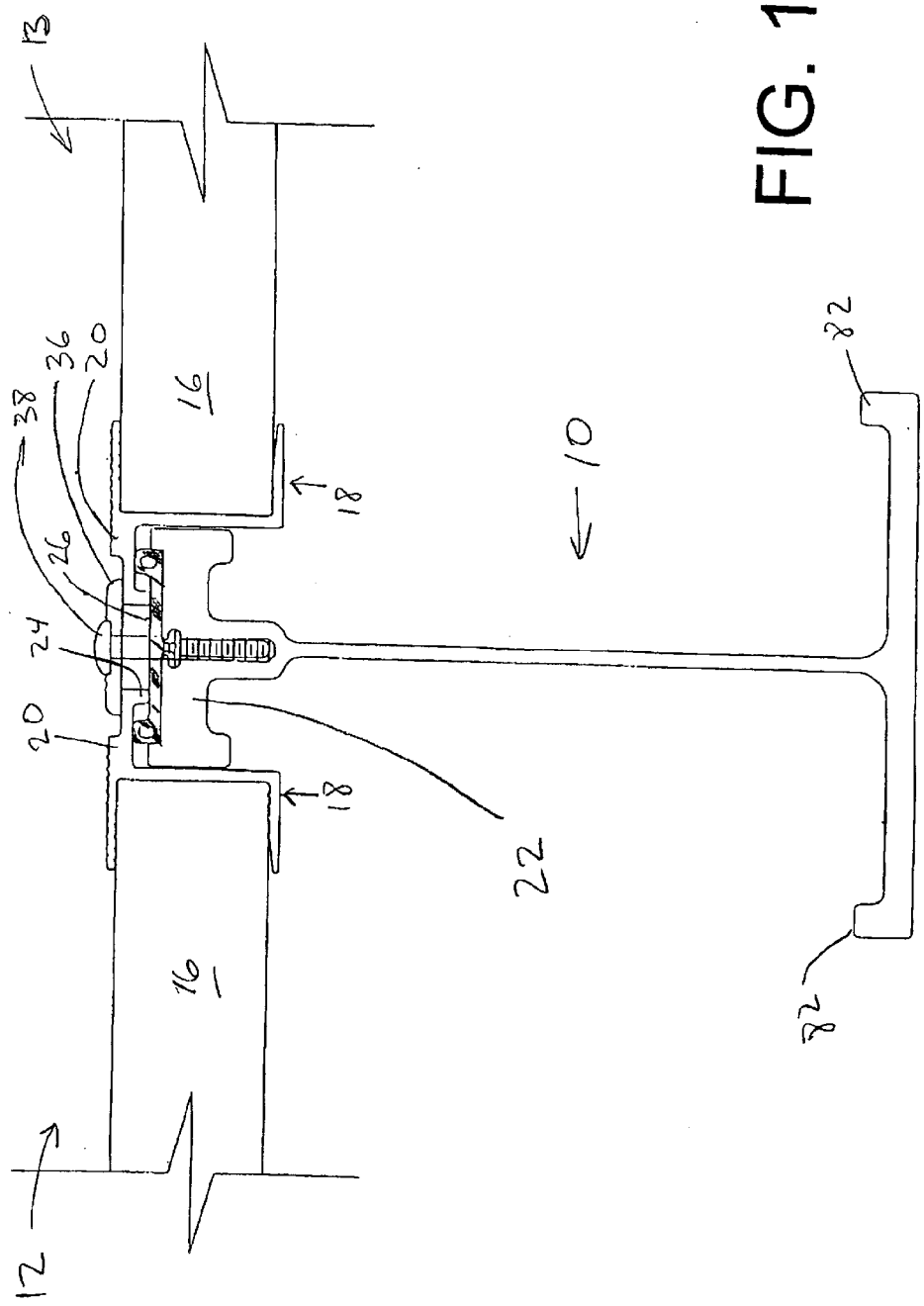
FIG. 1 is a sectional elevation view showing a spanning beam and adjacent cover panels forming a part of the system of the invention.
Figure 7:
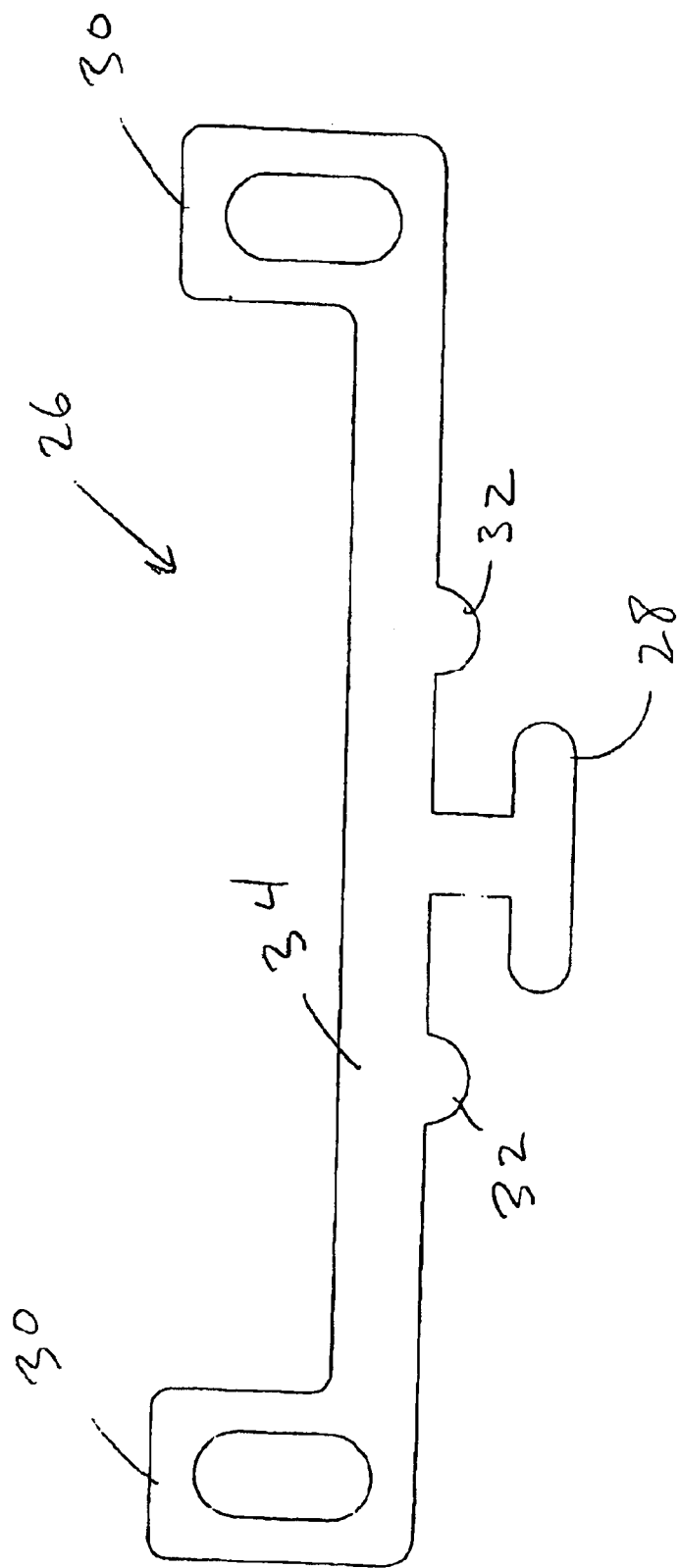
FIG. 7 is a sectional elevation view showing an elastomeric gasket seal used on tops of the beams.

FIG. 1 shows a portion of the system in cross section. One of the main spanning beams 10 is shown supporting a pair of adjacent deck panels 12 and 13. As noted above, these panels can be formed generally in accordance with the panel constructions shown in the previous patents referenced. The major components may be aluminum extrusions, some of the extrusions being deck planks as indicated at 16 and channel sections as shown at 18, the channel sections being assembled onto the ends of the series of deck planks 16, retaining the panels together. These channel sections pursuant to the invention also include overhanging flanges at 20 to extend over the top flange 22 of the beam 10, each flange 20 preferably having a downwardly depending lip 24. These lips extend over an elastomeric gasket seal 26, shown assembled on to the top of the beam flange 22 and captured therein by interlocking cross section, which may be generally a "T"-shape. The gasket 26 is shown in detail in FIG. 7, with the "T"-shaped interlock 28 at the bottom of the gasket, this being shaped complementarily to an extruded cavity in the beam flange. The gasket 26 preferably has hollow edge ridges or flanges 30 for compressibly engaging the channel flanges 20 when assembled thereon, and it also includes a pair of protruding ridges 32 at the bottom side of a main section 34 of the gasket. In the uncompressed state, the gasket 26 preferably is curled upwardly somewhat, so that the main section 34 is concavely curved and the flange ends 30 are at the upper edges of the curved configuration. When the gasket is engaged by the weight of the panels, it compresses down generally to the configuration shown in FIG. 7, and the bottom ridges 32 are pressed tightly and compressibly against the top of the beam, aiding in the gas seal.

FIG. 1 also show that an extruded, continuous cap 36 preferably is included in the assembly, pressing down against the channel flanges 20 to increase the sealing compression against the gasket 26. The cap 36, which may be of stainless steel, covers the gasket 26 at tops of the beams and aids in sealing. It may be retained down to the beam 10 by self tapping screws such as shown at 38, bored down through the center of the gasket 26 and tighten into the beam.

Figure 2:
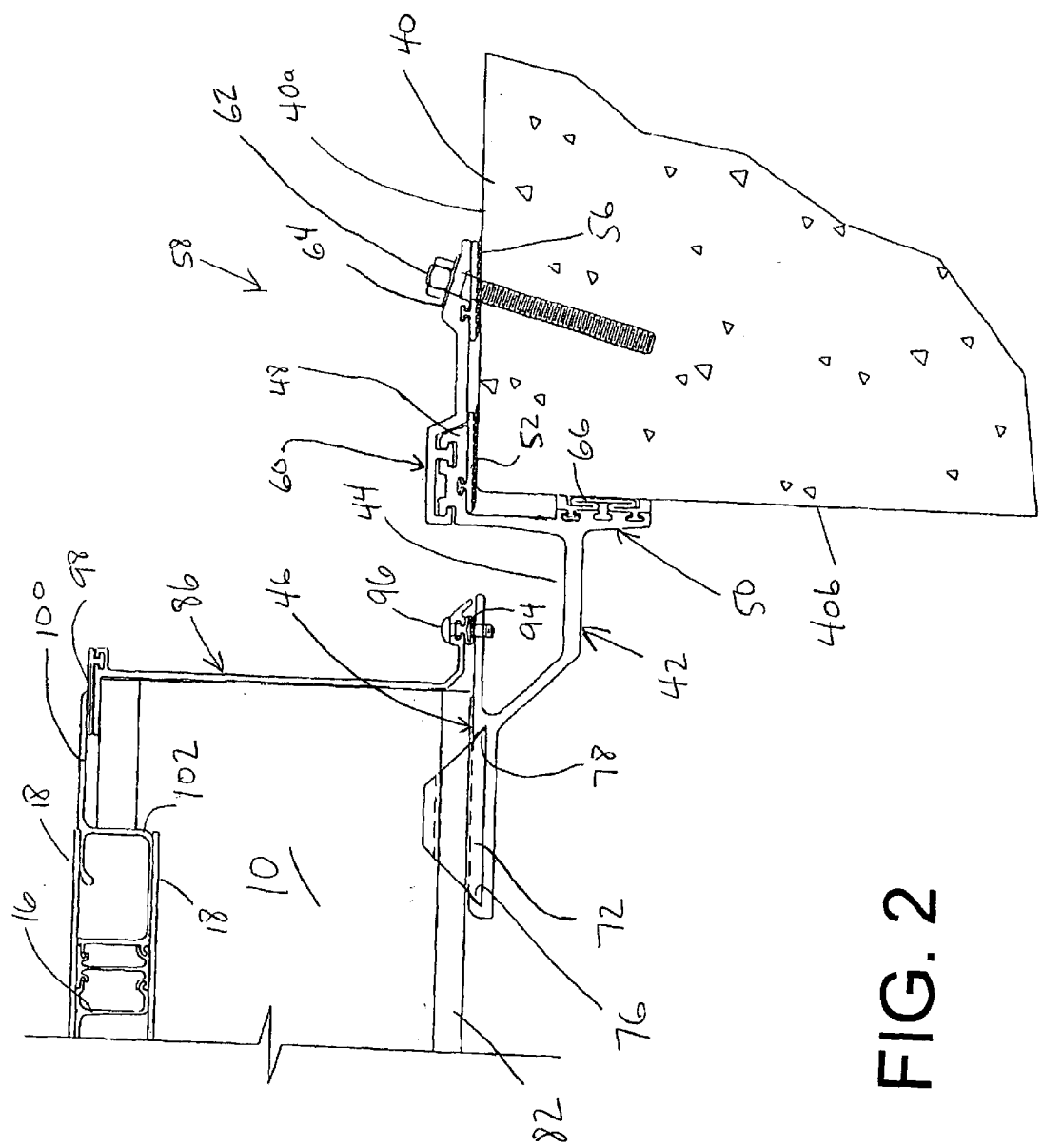
FIG. 2 is a sectional elevation view from a position perpendicular to that of FIG. 1, showing a spanning beam of the system resting on a gutter extrusion, which is secured to the edge of a tank.
Figure 4:
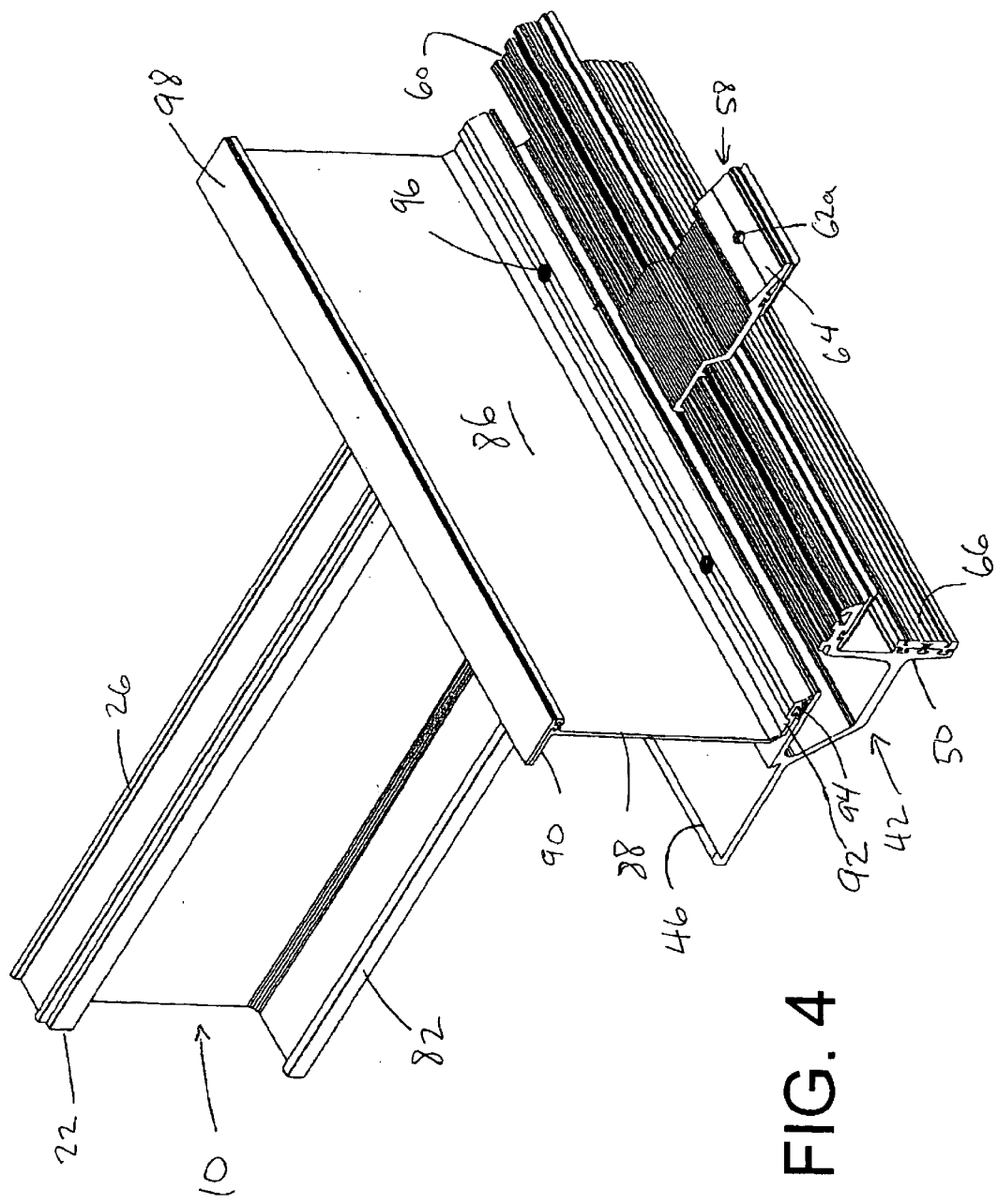
FIG. 4 is a perspective view showing a portion of the assembly shown in FIG. 2.

FIG. 2 shows a portion of the tank cover assembly from a position at 90° to the view shown in FIG. 1. Here, the edge 40 of the concrete tank on which the assembly is positioned. The beams 10 rest on a gutter extrusion 42, continuous throughout the length of a side of the tank which is represented at 40. A portion of this assembly is also shown in FIG. 4, and this discussion will refer to all of the drawings.

Figure 5:
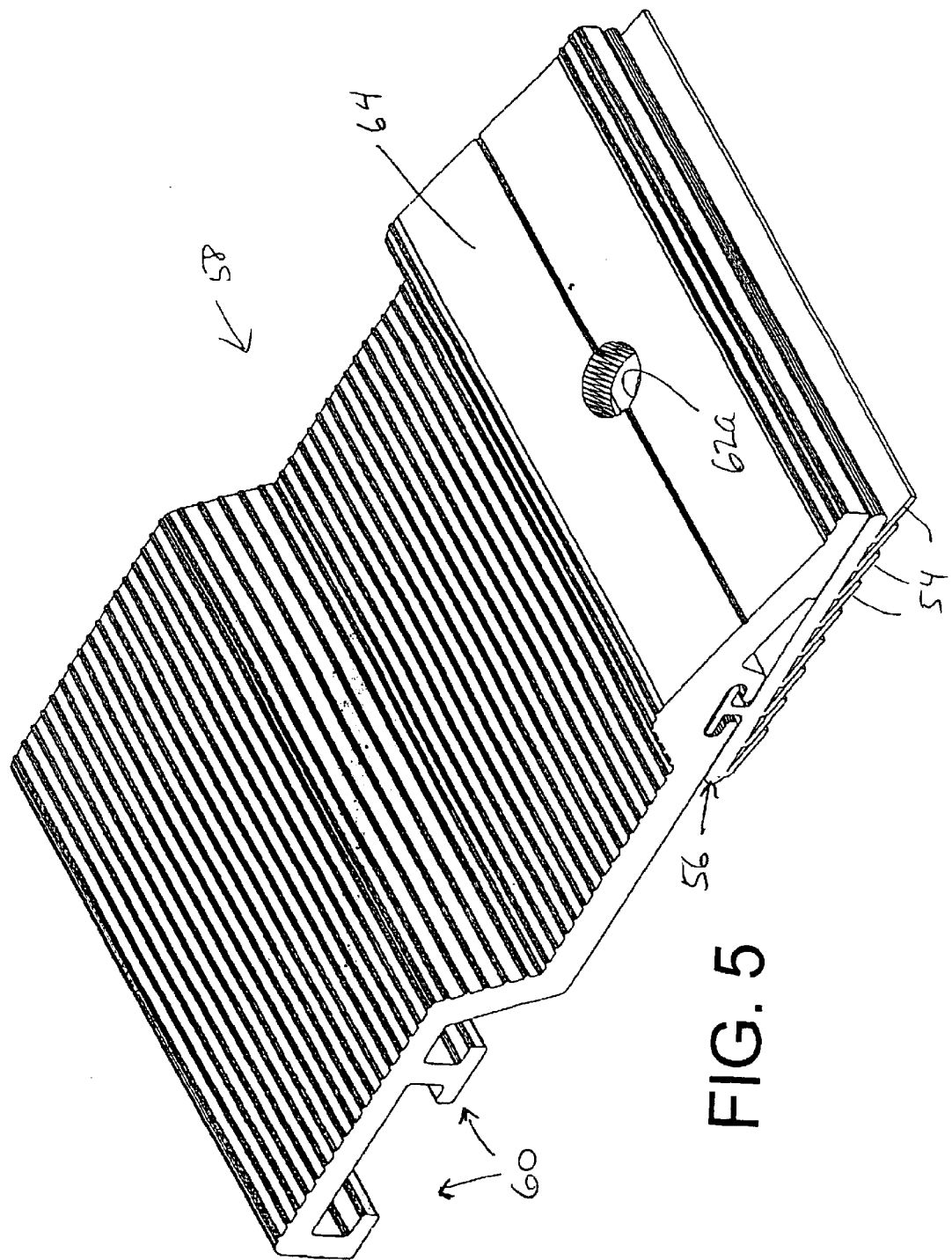
FIG. 5 is a perspective view showing a clip which retains the gutter extrusion in place.

The gutter extrusion 42 includes a gutter 44, a platform indicated at 46 and extending over the tank, and horizontal and vertical flanges shown at 48 and 50, for bearing against the top surface 40a and the inside vertical wall 40b of the tank as shown. These bearing flanges each have a gasket seal, assembled in the sliding, interlocking cross section arrangement which is typical of these components and shown in FIGS. 1 and 7 as well as FIG. 2 and FIG. 4. The horizontal seal 52 is compressible and preferably includes a series of deflectable fins extending lengthwise and similar to fins 54 shown on a similar gasket seal 56 in FIG. 5, attached to a gutter retention clip 58. The clip pad or gasket 56 is also shown in FIG. 2, but it has no sealing function, the retention clips or brackets 58 being non-continuous and of the proportions, for example generally shown in FIG. 5. These clips are located at intervals as needed, primarily at locations of the beam ends 10.

The retention clips 58 engage the gutter extrusion 42 preferably in a sliding interlocking cross section arrangement such as shown at 60, similar to other component-to-component assemblies of this system. Anchor bolts 62 retain the clips 58 to the concrete tank rim, preferably at an angle as discussed above and as shown in FIG. 2. The anchor bolt 62 passes through a bore 62a in an angle facet 64 of the clip, as seen in FIG. 2 and as better illustrated in FIG. 5.

Figure 8:
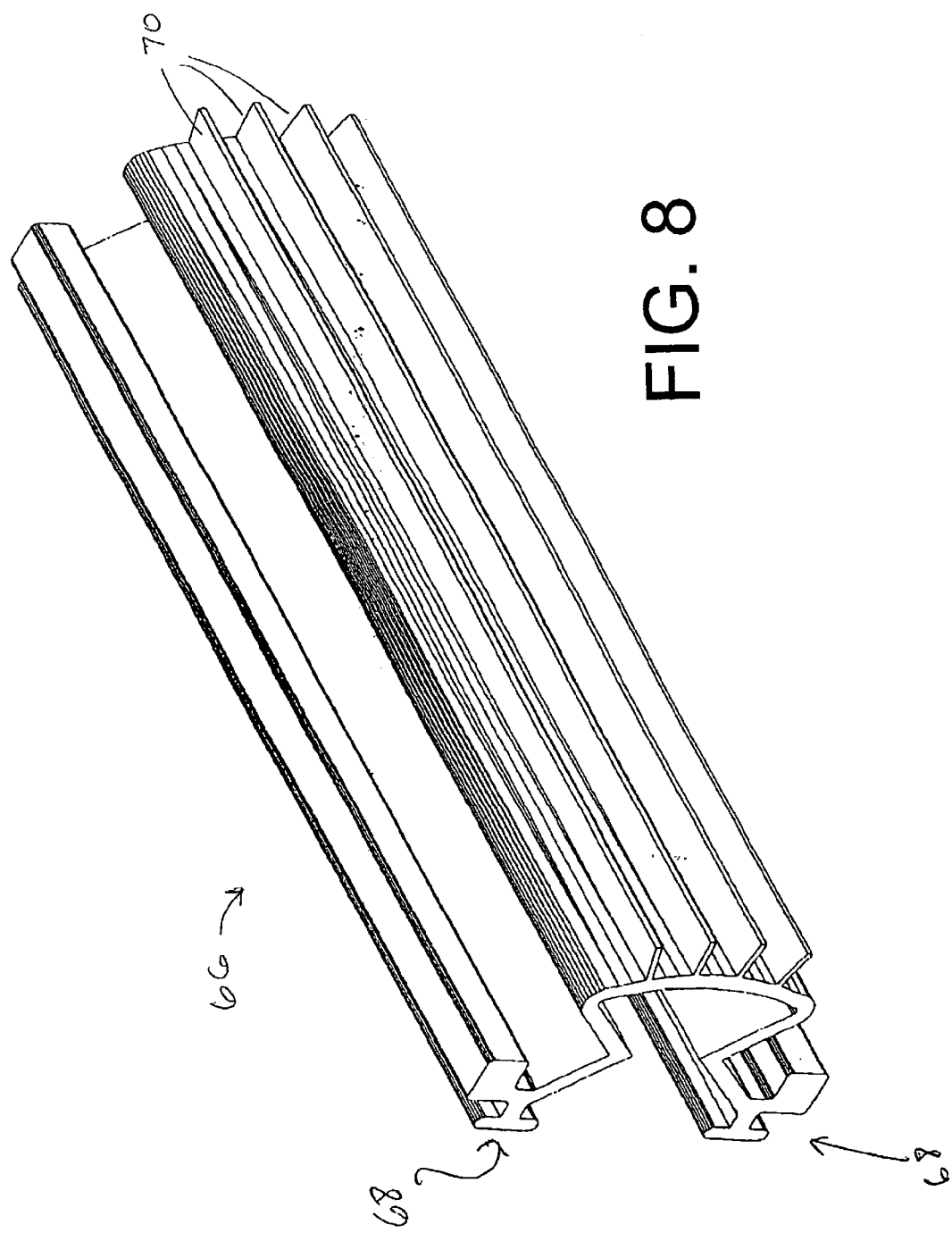
FIG. 8 is a perspective view showing a section of an elastomeric gasket seal secured to the gutter extrusion and which bears against the tank wall.

As noted above, the gutter extrusion 42 engages, in substantially sealing engagement, both the horizontal surface 40a and vertical wall 42 of the concrete tank rim 40. The gasket 66 engaging the wall 40b is indicated in FIG. 2 but better seen in FIG. 8. The seal 66 is a structural component as well as sealing component, and may be formed in pleated or bellows type configuration as shown in FIG. 8. The seals, particularly the seal 66, may be of multi-durometer elastomeric material, advantageously Santoprene. Again, the gasket 66 is provided with an interlocking cross section as shown at 68 for engaging in an interlocking fashion with the aluminum extrusion. This seal, like the seals discussed above, may be provided with fins or wipers 70 to aid in the sealing function. The elastomeric gasket seal 66 shown in FIG. 8 is capable of sealing against a wall with considerable irregularities. As shown in FIG. 2, the gasket seal 66 also serves to hold the extrusion 42 off the concrete wall, compressing the seal 66 and in that sense comprising a structural component.

As mentioned above, the end of the beam 10 rests on a platform 46 formed as part of the aluminum extrusion 42 and overhanging the tank. The beam is not fixedly secured to the gutter extrusion 42 in a preferred embodiment. Instead, as explained above, it is allowed to move in the lengthwise direction of the beam to accommodate thermal expansion/contraction, thus sliding left to right on the platform as seen on FIG. 2. The beam is retained on the platform by a hold-down slidable member 72, also seen in FIG. 3. This member 72 can be an aluminum extrusion, extruded in the direction of the arrow 74 in FIG. 3, then cut into the shape shown. This shape engages with an undercut slot extending between the acute undercuts 76 and 78 in FIG. 2, providing a connection that lets the hold-down component 72 slide along the length of the gutter extrusion 42 (into and out of the paper in FIG. 2).

Figure 3:
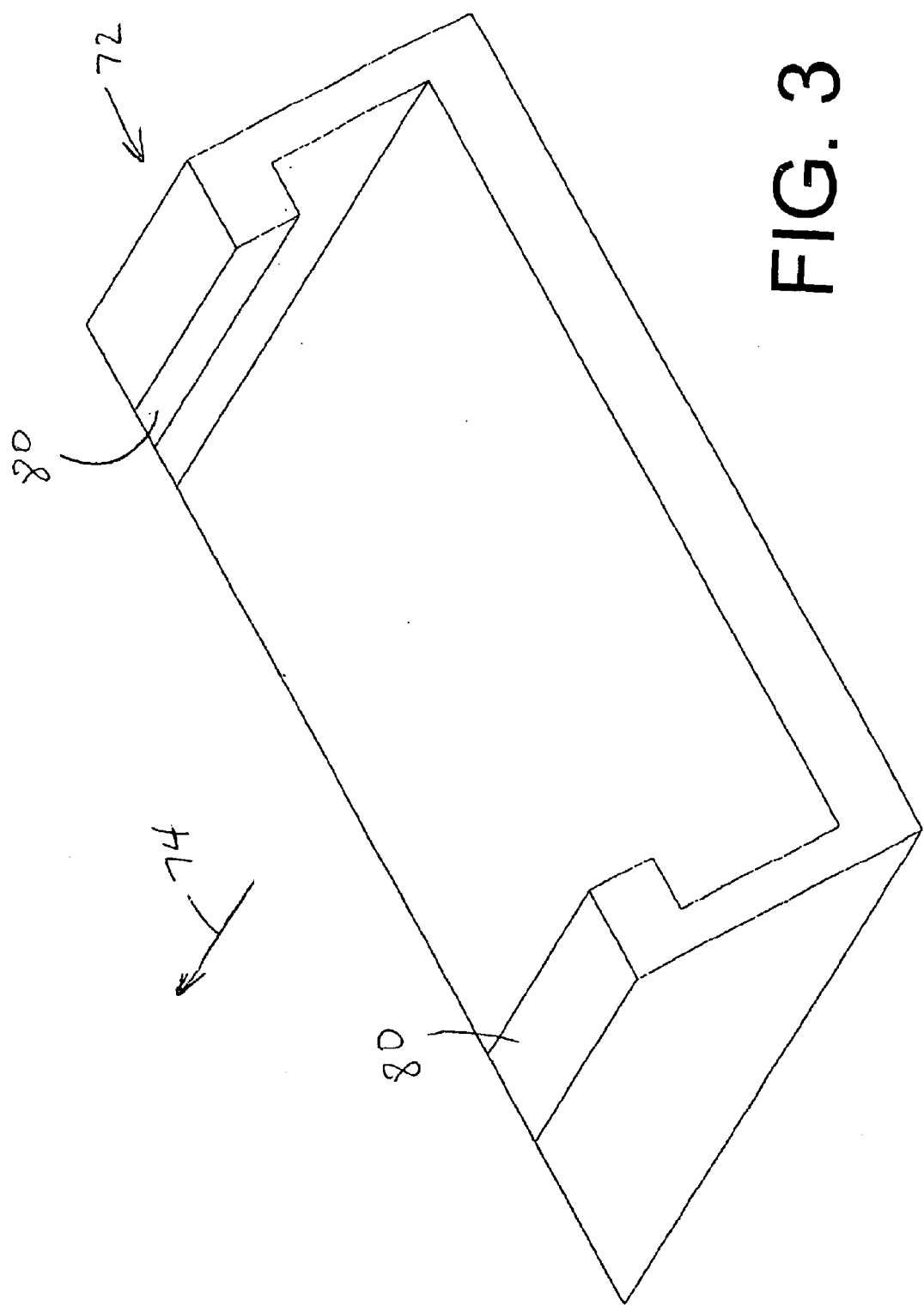
FIG. 3 is a perspective view showing a hold-down slidable connection member.

As can be seen in FIGS. 2 and 3, the hold-down member 72 has flanges or lips 80 which capture the beam flange edges 82, one of which is seen in FIGS. 2, 4 and 1. This connection is also slidable, allowing the noted expansion/contraction movement of the beam relative to the hold-down 72 and the gutter extrusion 42. Thus, the beam end is allowed to move in both perpendicular directions, aiding in correct positioning of the beams upon assembly and accommodating thermal expansion/contraction.

Figure 6:
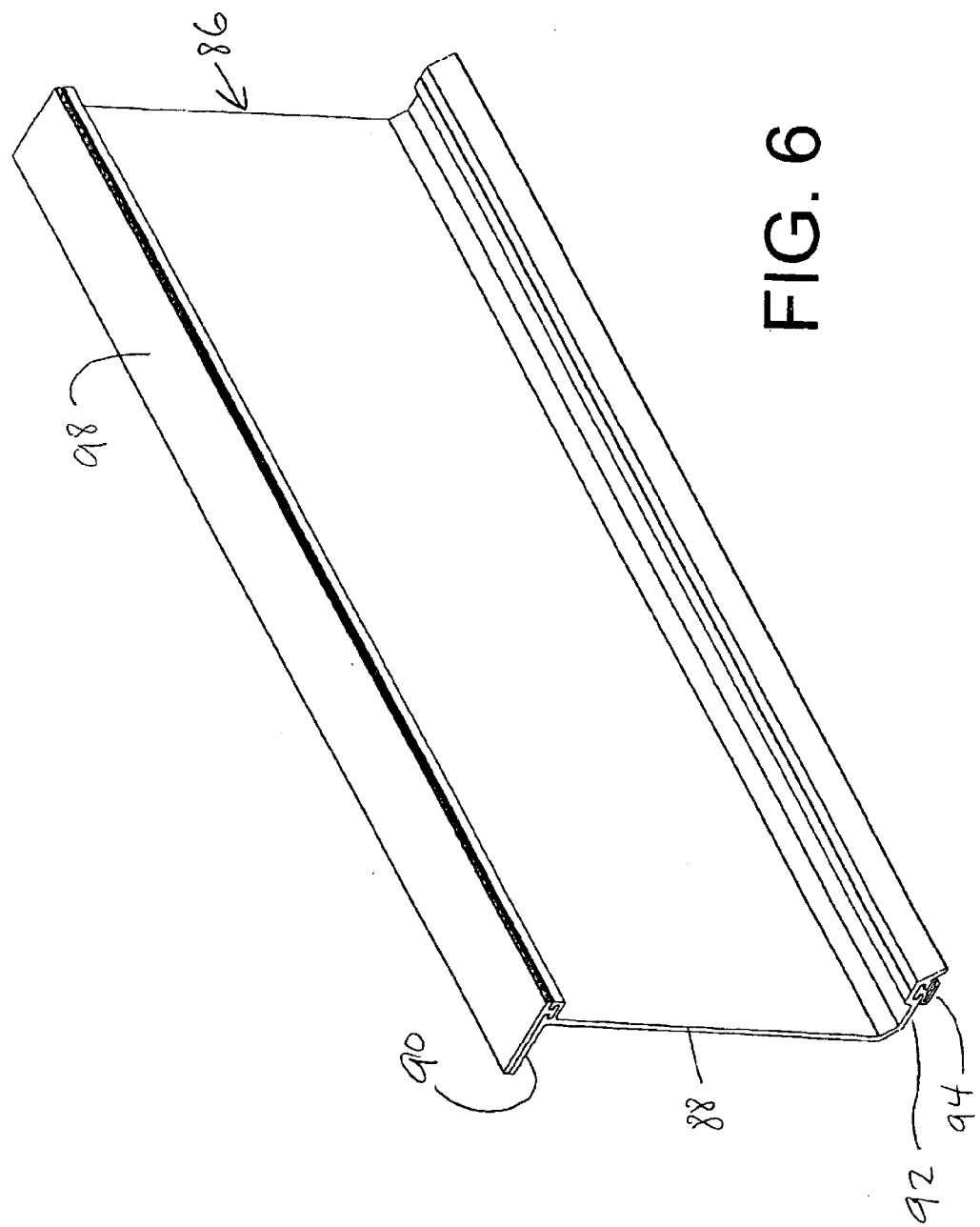
FIG. 6 is a perspective view showing a section of an elongated flashing member which seals the assembly across ends of the beam.

As explained above, the panels such as those 12 and 13, shown in FIG. 1, and made up of assembled aluminum extrusions, rests on the tops of the beams 10. This provides the needed seal at left and right of each beam, where the beam meets the decking panels. At ends of the beams, a seal is needed for the space between beams, and this is provided by a flashing member 86 which is continuous throughout the length of a side of the tank. This flashing member 86 is shown in FIGS. 2, 4 and 6. It can be of a generally Z-shaped configuration in cross section, having a tall web 88, inwardly turned upper flange 90 and an outwardly turned lower flange 92. At the bottom, the lower flange retains an interlock configuration and elastomeric sealing gasket 94, bearing down against the gutter extrusion platform 46. Fasteners, such as self tapping screws 96, preferably are used to retain the flashing member 86 to the gutter extrusion. At the upper end of the flashing 86, however, the flashing preferably is not fixedly secured to the beam 10. The upper flange 90 supports, an interlocking cross section arrangement as previously illustrated, a gasket 98. The upper flange 90 engages downwardly against the sealing gasket 26 which is secured to the top of the beam 10. When the panels are erected onto the beams, the channel members 18 (FIG. 1; also seen in FIG. 2) terminate prior to the end of the beam 10, preferably at the point where an overhanging flange 100 on an extrusion 102 extends outwardly (to the right in FIG. 2) from the extrusion 102. The extrusion 102 can be a variation of the deck planks 16, used as a boarder member for the panel and including the special flange 100 for sealing this part of the system. As shown, this sealing flange 102 bears down against the gasket 98 at the top of the flashing 86. Since the elastomeric beam top gasket 26 preferably abuts into the edge of the flashing top flange 90 and/or its gasket 98, and the corner of the decking panel closely engages both gaskets, the seal is substantially gas tight in this region.

At ends of the gutter extrusions 42, i.e. at ends of the tank, the gas seal is made in a different way. For example, horizontal flashing may extend from the lower flange of the beam 10 closes to that end of the tank, across to an engagement with the wall of the tank. Such horizontal flashing (not shown) may then engage in seal relationship with the inward surface of the platform 46 of the gutter extrusion 42, which can be envisioned from FIG. 4. If FIG. 4 were assumed to show the left end of the gutter extrusion 42, this extrusion end can be sealed against the tank endwall, and if horizontal flashing can then be placed in engagement with both the lower beam flange 82 and the platform 46, also sealing against the tank endwall. Other arrangements are possible as well.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

What is claimed is:

1. A substantially gas tight cover in combination with an open-top structure comprising a tank or channel having a cover-supporting rim or edge including a pair of generally parallel rims at opposite sides of the tank or channel, comprising:

a gutter extrusion at each side of the tank or channel, engaging each of the parallel rims, each gutter extrusion being substantially continuous throughout the length of the parallel rim and including a gutter for catching water, a rim top engagement flange for engaging a horizontal surface of the rim, a rim wall engaging flange positioned to engage against an inside wall of the rim, and a beam connection extending over the tank for securement to an end of a structural beam, a series of spaced apart, generally parallel structural beams, each extending generally from one of said parallel rims to the other and having ends in engagement with the gutter extrusions and supported by the gutter extrusions, a series of decking panels extending between structural spanning beams and resting on the structural spanning beams, the decking panels having flanges engaging the beams in substantially gas sealed relationship, with an elastomeric gasket positioned between the panel and the beam, a flashing member extending substantially continuously along the length of each gutter extrusion, and sealingly connected to the gutter extrusion and extending upwardly to close spaces between ends of the spanning beam, the flashing being in substantially sealed relationship with the decking panels, the gutter extrusion having a sealing gasket creating a substantial gas seal between the gutter extrusion and the tank rim, and a series of spaced clips retaining the gutter extrusion to the tank rim, each clip being secured to the rim top engaging flange of the gutter extrusion and extending generally horizontally outwardly, away from the tank and being secured to the tank rim near an outer end of the clip.

2. The combination defined in claim 1, wherein the sealing gasket of the gutter extrusion comprises two separate sealing members, both being substantially continuous along the length of the gutter extrusion, including a first sealing member on the rim top engagement flange and engaging said horizontal top surface of the rim, and a second sealing member on the rim wall engaging flange and engaged against said inside wall of the rim.

3. The combination defined in claim 2, wherein the second sealing member comprises a pleated or bellows configuration, and serving as a structural component by holding the rim wall engaging flange off the wall of the rim, the rim wall, engaging flange not contacting the wall of the rim directly.

4. The combination defined in claim 1, wherein the sealing gasket of the gutter extrusion includes a rim wall engagement gasket on the rim wall engaging flange, comprising a pleated or bellows configuration and serving as a structural component by holding the rim wall engaging flange off the wall of the rim, the rim wall engaging flange not contacting the wall of the rim directly.

5. The combination defined in claim 1, further including slidable connection means supporting the structural beams on the gutter extrusion, allowing the structural beams to move in two perpendicular directions relative to the gutter extrusion, parallel to the tank rim and toward/away from the tank rim, to accommodate thermal expansion and contraction.

6. The combination defined in claim 5, wherein the slidable connection means comprises a hold-down slidable member which is slidably engaged on edges of a bottom flange of the structural beam, permitting movement toward/away from the tank rim, the hold-down slidable member itself being slidably secured on the gutter extrusion so as to permit movement parallel to the tank or channel rim.

7. The combination defined in claim 1, wherein the spaced clips retaining the gutter extrusion to the tank rim are each held to the tank rim by an anchor bolt, such anchor bolts being the only securement of the gutter extrusion to the tank rim, avoiding any fasteners penetrating the inside wall of the rim.

* * * * *